(12) United States Patent
Yakout et al.

(10) Patent No.: US 8,577,849 B2
(45) Date of Patent: Nov. 5, 2013

(54) GUIDED DATA REPAIR

(75) Inventors: Mohamed Yakout, Doha (QA); Ahmed K. Elmagarmid, Doha (QA); Jennifer Neville, Doha (QA); Mourad Ouzzani, Doha (QA); Ihab Francis Ilyas Kaldas, Doha (QA)

(73) Assignee: Qatar Foundation, Doha (QA)

( * ) Notice: Subject to any disclaimer, the term of this patent is extended or adjusted under 35 U.S.C. 154(b) by 0 days.

(21) Appl. No.: 13/110,246

(22) Filed: May 18, 2011

(65) Prior Publication Data

US 2012/0296879 A1 Nov. 22, 2012

(51) Int. Cl.
*G06F 7/00* (2006.01)
*G06F 17/30* (2006.01)
(52) U.S. Cl.
USPC ............... 707/690; 707/691

(58) Field of Classification Search
USPC ........... 707/999.003, 999.009, 687, 690, 691, 707/694
See application file for complete search history.

(56) References Cited

U.S. PATENT DOCUMENTS 5,504,890 A * 4/1996 Sanford ................. 707/999.003
6,968,348 B1 * 11/2005 Carone et al. ................ 707/696

* cited by examiner

*Primary Examiner* — Vincent F Boccio
(74) *Attorney, Agent, or Firm* — Mossman Kumar & Tyler PC

(57) ABSTRACT

A computer implemented method for correcting records in a database comprising generating, using a processor, respective candidate replacement entries for multiple inconsistent records of the database, grouping the candidate replacement entries to provide multiple groups of related candidate updates for the database, ranking the groups according to a loss function to quantify database quality, receiving input for a selected group, sorting candidate replacement entries in the selected group, and applying updates from the selected group to the database to correct entries of the inconsistent records.

17 Claims, 6 Drawing Sheets

|    | Name  | SRC | STR           | CT            | STT | ZIP   |
|----|-------|-----|---------------|---------------|-----|-------|
| t1: | Jim   | H1  | REDWOOD DR    | MICHIGAN CITY | MI  | 46360 |
| t2: | Tom   | H2  | REDWOOD DR    | WESTVILLE     | IN  | 46360 |
| t3: | Jeff  | H2  | BIRCH PARKWAY | WESTVILLE     | IN  | 46360 |
| t4: | Rick  | H2  | BIRCH PARKWAY | WESTVILLE     | IN  | 46360 |
| t5: | Joe   | H1  | BELL AVENUE   | FORT WAYNE    | IN  | 46391 |
| t6: | Mark  | H1  | BELL AVENUE   | FORT WAYNE    | IN  | 46825 |
| t7: | Cady  | H2  | BELL AVENUE   | FORT WAYNE    | IN  | 46825 |
| t8: | Sindy | H2  | SHERDEN RD    | FT WAYNE      | IN  | 46774 |

Figure 1

GUIDED DATA REPAIR

BACKGROUND

A database is a collection of information arranged in an organized manner. A typical database might include medical, financial or accounting information, demographics and market survey data, bibliographic or archival data, personnel and organizational information, public governmental records, private business or customer data such as addresses and phone numbers, etc.

Such information is usually contained in computer files arranged in a pre-selected database format, and the data contents within them can be maintained for convenient access on magnetic media, both for storage and for updating the file contents as needed.

Poor data quality can have undesirable implications for the effectiveness of a business or other organization or entity. For example, in healthcare, where incorrect information about patients in an Electronic Health Record (EHR) may lead to wrong treatments and prescriptions, ensuring the accuracy of database entries is of prime importance.

A large variety of computational procedures for cleaning or repairing erroneous entries in databases have been proposed. Typically, such procedures can automatically or semi-automatically identify errors and, when possible, correct them. For example, one approach for repairing so-called dirty databases is to use data quality rules in the form of database constraints to identify records with errors and inconsistencies and then use these rules to derive updates to these records. Most of the existing data repair approaches focus on providing fully automated solutions using different heuristics to select updates that would introduce minimal changes to the data.

SUMMARY

According to an example there is provided a computer implemented method for correcting records in a database comprising generating, using a processor, respective candidate replacement entries for multiple inconsistent records of the database, grouping the candidate replacement entries to provide multiple groups of related candidate updates for the database, ranking the groups according to a loss function to quantify database quality, receiving input for a selected group, sorting candidate replacement entries in the selected group, and applying updates from the selected group to the database to correct entries of the inconsistent records.

According to an example there is provided a computer program embedded on a non-transitory tangible computer readable storage medium, the computer program including machine readable instructions that, when executed by a processor, implement a method comprising identifying multiple records in a database including respective inconsistent data entries, generating a set of candidate replacement records for the database in which the inconsistent data entries are modified to provide modified data entries, classifying the replacement records into sets according to one or more criteria relating to the respective modified data entries of the records, receiving user input representing a confirmation, rejection or modification of a modified data entry in a replacement record in a set, and updating the database on the basis to the received user input.

According to an example there is provided apparatus for updating a database including multiple inconsistent data records, comprising a storage device to store multiple data records of the database, a processor, coupled to the storage device, to determine a set of inconsistent data records of the database by comparing respective ones of the data records against multiple data quality measures representing conditional functional dependencies of the data records, and to generate a set of replacement records including modified data entries, and to group the replacement records into multiple groups based on the modified data entries, a user input device to receive user input data representing user input for the apparatus and representing an indication of accuracy of a modified data entry in a group, and a learning module to receive the user input data and to generate a set of revised replacement records for the database.

BRIEF DESCRIPTION OF THE DRAWINGS

FIG. 1 is an example of a simple database;

DETAILED DESCRIPTION

A database typically includes multiple data records which can be subdivided into one or more fields or entries containing a type of data such as binary, alphanumeric or other type of data for example. An entry or multiple entries of a record can be inaccurate or inconsistent. This can be as a result of corruption in a database file for example, or as a result of inaccurate data entry or unknown values.

FIG. 1 is an example of a simple database which includes 8 tuples (records) labelled t1-t8. Each record includes six entries representing various attributes for a customer whose name is given in the first column of the database structure depicted. Data quality rules can be defined in the form of Conditional Functional Dependencies (CFDs). According to an example, a CFD is a pair consisting of a standard Functional Dependency (FD) and a pattern tableau that specifies the applicability of the FD on parts of the data.

A set of CFD rules for the database of FIG. 1 could therefore be as follows:

$\phi_1$: (ZIP→CT, STT, {46360||MichiganCity, IN})
$\phi_2$: (ZIP→CT,STT, {46774||NewHaven, IN})
$\phi_3$: (ZIP→CT,STT, {46825||FortWayne, IN})
$\phi_4$: (ZIP→CT, STT, {46391||Westville, IN})
$\phi_5$: (STR, CT→ZIP,{-, FortWayne||-})

Accordingly, $\phi_1$-$\phi_4$ state that the FD ZIP→CT,STT (zip codes uniquely identify city and state) holds in the context where the ZIP is 46360, 46774, 46825 or 46391. Moreover, the pattern tableau enforces bindings between the attribute values. For example, if ZIP=46360, then CT='Michigan City'. $\phi_5$ states that the FD STR,CT→ZIP holds in the context where CT='Fort Wayne', that is, street names can uniquely identify the zip codes whenever the city is 'Fort Wayne' in the example shown. Other examples are possible.

Note that in the example of FIG. 1, all the tuples violate one or more of the CFD rules given above. Various procedures for seeking to repair such violations exist. According to an example, a data repair process includes generating, using a processor, respective candidate replacement entries for multiple inconsistent records of the database and grouping the candidate replacement entries to provide multiple groups of related candidate updates for the database. The groups are ranked according to their value to database quality computed using a loss function. A user input for a selected group is received, and candidate replacement entries in the selected group are sorted. Suitable updates from the selected group can then be applied to the database to correct entries of the inconsistent records.

Figure 2:
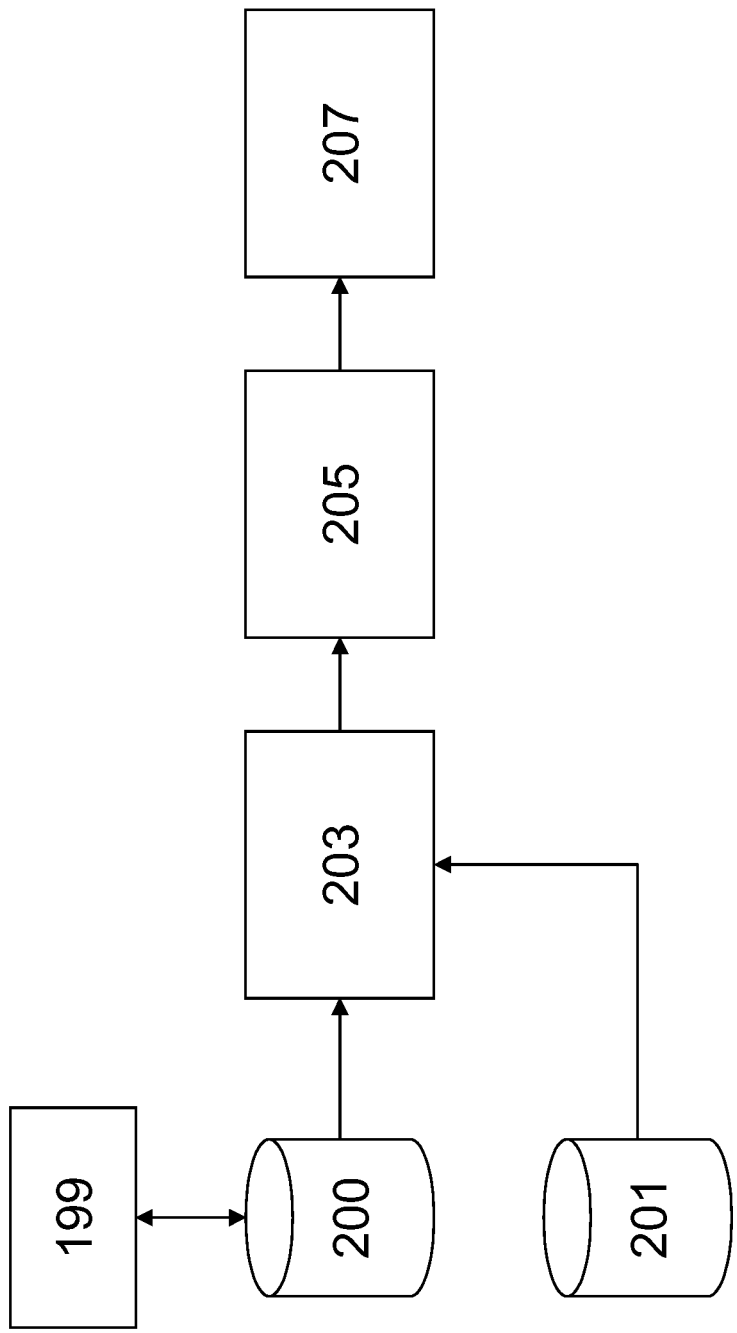
FIG. 2 is a schematic block diagram of a data repair system according to an example.

FIG. 2 is a schematic block diagram of a portion of a data repair system according to an example. A database 200 provides a repository for multiple data items such as digital data items representing one or more databases stored in memory or on a hard disk drive or removable storage medium. Typically, each database will store relational tables/indexes for a collection of information which is organized to permit selection of desired pieces of data. A database 200 according to an example can be organized by fields (or entries), records (or tuples), and files. A field can be a single piece of information; a record can be one set of fields; and a file can be a collection of records. Other alternatives are possible, and the above is not intended to be limiting. According to an example, information from database 200 can be accessed using a database management system (DBMS) 199, which can be a single or multiple computer programs that effect the entering, organization, and selection of data in database 200.

A set of data quality rules 201 are provided. According to an example, the data quality rules 201 are conditional functional dependencies which can be used to enforce patterns of semantically related constants. In block 203 inconsistent tuples from database 200 are identified using rules 201. More specifically, any tuples or records in database 200 which do not conform to one or more of the rules 201 can be identified, selected or otherwise flagged as 'dirty' records—that is, records in which one or more entries appear to be missing, inconsistent or inaccurate in view of the rules 201. For example, for a set of CFDs $\Sigma$, dirty tuples can be identified through violations of $\Sigma$ and stored in a list. A tuple t is considered dirty if $\exists \phi \in \Sigma$ such that $t|\neq\phi$, i.e., t violates rule $\phi$.

According to an example, an on demand update discovery process for resolving CFDs violations and generating candidate updates can be used. The process can be triggered to suggest an update for t[A], the value of attribute A, in tuple t. Initially, the process can be called for all dirty tuples and their attributes. Later during interactions with a user, it can be triggered as a consequence of receiving user feedback.

The generated updates are tuples in the form $r_j = \langle t, A, v, s_j \rangle$ and stored in a list of possible updates 205, where v is the suggested value in t[A] and $s_j$ is the update score. $s_j \in [0 \ldots 1]$ can be assigned to each update $r_j$ by an update evaluation function to reflect the certainty of the repairing technique about the suggested update. Typically, the evaluation function is a measure of closeness in distance between the original and suggested values using some domain distance function.

For example, with reference to FIG. 1, $t_5$ violates $\phi_4$ and a possible update would be to either replace CT by 'Westville' or replace ZIP by 46825, which would make $t_5$ fall in the context of $\phi_3$ and $\phi_5$ but without violations. Typically, to decide which update to apply, different heuristics can be used.

However, such automatic changes to data can be problematic, especially if the data is critical. Involving the user to disambiguate can be expensive because of the potentially large number of possibilities to be verified. According to an example, to efficiently involve a user of the database 200 in guiding the cleaning process, suggested updates can be presented in groups or tiers which share some contextual information. Accordingly, a user can quickly inspect a group of tuples where the value 'Michigan City' is suggested for the CT attribute for example.

Referring to the example in FIG. 1, a cleaning (repairing) algorithm could suggest two groups of updates, the first group of which includes replacing the attribute CT with the value 'Michigan City' for $t_2$, $t_3$, and $t_4$, the second group including replacing the attribute ZIP with the value 46825 for $t_5$ and $t_8$. According to an example, user feedback on the correct values can be obtained. For example, for the first group the feedback could be in the form of confirmation that 'Michigan City' is a correct value of the CT for $t_2, t_3$, but is incorrect for $t_4$, and that for the second group that 46825 is the correct value of ZIP for $t_5$, but is incorrect for $t_8$. In this example, obtaining feedback for the first group will provide faster convergence to a cleaner database instance because it has more correct updates than the updates from the second group. As such, the second group will not lead to convergence as quickly as the case in which the updates from the first group are applied.

In block 207, the suggested updates 205 are grouped to provide multiple groups of updates. Grouping of the possible updates allows a batch inspection to be quickly and efficiently performed. Such grouping can also provide a useful-looking set of updates with some common contextual information which will be easier for a user to handle and process. Further, providing a machine learning algorithm with a group of training examples that have some correlations due to grouping can increase a prediction accuracy compared with providing random, unrelated examples. According to an example, a grouping function in which tuples with the same update value in a given attribute are grouped together can be used. Other alternatives are possible which provide multiple groups each including a set of updates sharing a common contextual thread.

Figure 3:
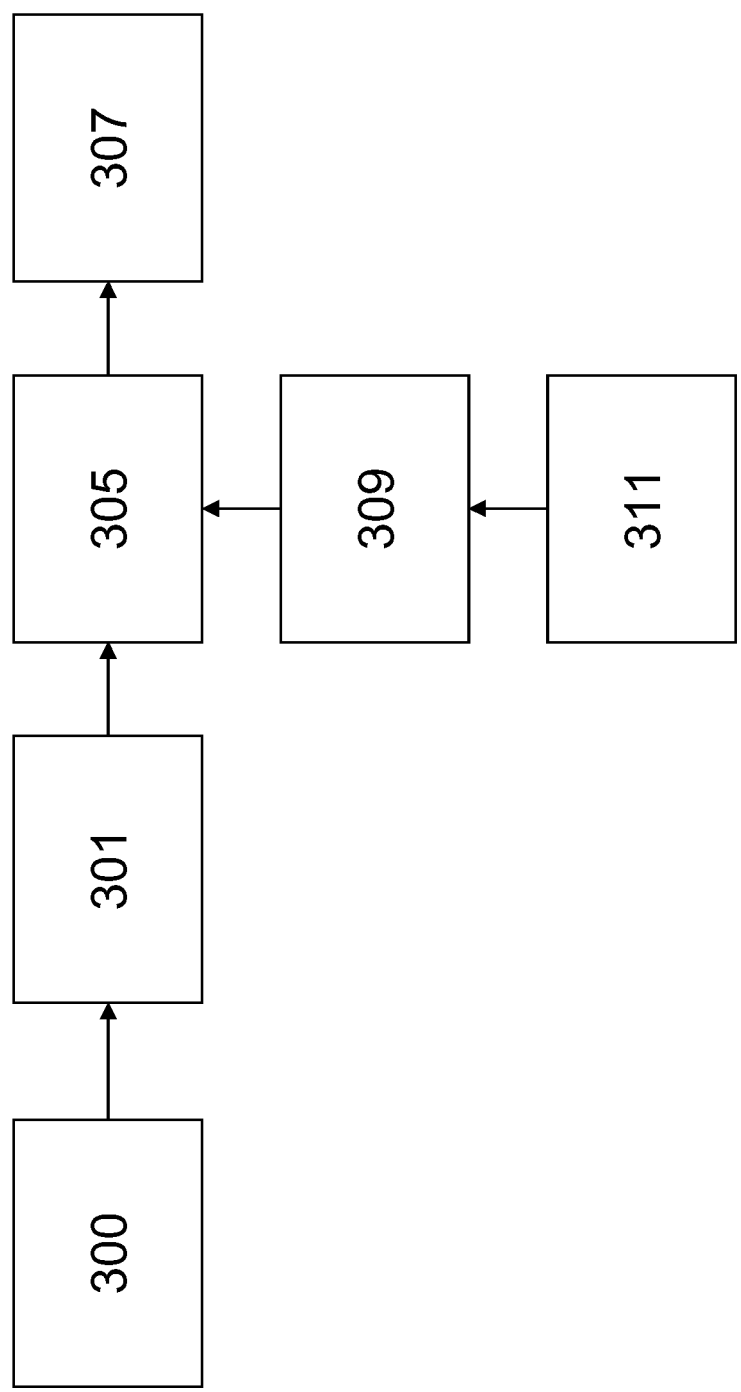
FIG. 3 is a schematic block diagram of a portion of a data repair process according to an example.

FIG. 3 is a schematic block diagram of a portion of a data repair process according to an example. In block 300, a set of groups 207 are sorted to provide a ranked listing of groups. According to an example, sorting can use a loss (or utility) function to quantify a desirability of a given level of database quality. In order to determine which group of updates to forward to a user, data quality loss before and after the user works on a group of updates is compared. More specifically, a data quality loss function, L, based on the quantified violations to the rules $\Sigma$ is used. Since the exact loss in quality cannot be measured, a set of approximations that allow efficient estimation of this quality loss are used.

For a database D and a CFD $\phi$, a tuple t violation w.r.t $\phi$ is denoted $vio(t, \{\phi\})$ as follows:

$$vio(t, \{\phi\}) = \begin{cases} 1 & \text{if } \phi \text{ is a constant } CFD. \\ \text{Number of tuples } t' \\ \text{that violate } \phi \text{ with } t & \text{if } \phi \text{ is a variable } CFD. \end{cases}$$

Consequently, the total violations for D with respect to $\Sigma$ is:

$$vio(D, \Sigma) = \sum_{\phi \in \Sigma} \sum_{t \in D} vio(t, \{\phi\}).$$

According to an example, the violation can be scaled using a weight attached to the tuple and representing a measure of the importance that the tuple is clean (that is, consistent or accurate).

For the database instance D and a group $c=\{r_1, \ldots, r_J\}$, if user feedback on $r_j$ is received, there are two possible cases: either the user confirms $r_j$ to be applied or not. The two corresponding database instances can be denoted as $D^{r_j}$ and $D^{\bar{r}_j}$, respectively. If a user confirms $r_j$ with a probability $p_j$, then the expected data quality loss after consulting the user on $r_j$ can be expressed by: $p_j L(D^{r_j}) + (1-p_j) L(D^{\bar{r}_j})$. According to an example, if all the updates within the group c are independent then the update benefit g (or data quality gain) of acquiring user feedback for the entire group c can be expressed as:

$$g(c) = L(D|c) - \sum_{r_j \in c} \left[ p_j L(D^{r_j}) + (1-p_j) L(D^{\bar{r}_j}) \right] \quad (1)$$

where L(D|c) is the current loss in data quality given that c is suggested.

A quality loss is inversely proportional to the degree of satisfaction of the specified rules $\Sigma$ according to an example. Other alternatives are possible. To compute L(D|c), the quality loss with respect to $\phi \in \Sigma$, namely $ql(D|c,\phi)$ is determined. If $D^{opt}$ is the clean database instance desired by a user, ql can be expressed as:

$$ql(D|c, \phi) = 1 - \frac{|D| = \phi|}{|D^{opt}| = \phi|} = \frac{|D^{opt}| = \phi| - |D| = \phi|}{|D^{opt}| = \phi|} \quad (2)$$

where $|D|=\phi|$ and $|D^{opt}|=\phi|$ are the numbers of tuples satisfying the rule $\phi$ in the current database instance D and $D^{opt}$, respectively. Consequently, the data quality loss, given c, can be computed for Eq. 1 as follows:

$$L(D|c) = \sum_{\phi_i \in \Sigma} w_i \times ql(D|c, \phi_i). \quad (3)$$

where $w_i$ is a user defined weight for $\phi_i$. These weights are user defined parameters according to an example. The values $$w_i = \frac{|D(\phi_i)|}{|D|},$$

where $|D(\phi_i)|$ is the number of tuples that fall in the context of the rule $\phi_i$ can be used for example. Accordingly, the more tuples that fall in the context of a rule, the more important it is to satisfy this rule.

According to an example, to approximate $p_j$, user feedback can be learned for the suggested updates. $p_j$ can be approximated by a prediction probability, $\tilde{p}_j$, of having $r_j$ correct. Since initially there is no feedback, $s_j$ is assigned to $\tilde{p}_j$, where $s_j \in [0,1]$ is a score that represents the repairing algorithm certainty about the suggested update $r_j$.

To compute the overall quality loss L in Eq. 3, the quality loss with respect to a particular rule $\phi$, i.e., $ql(D|c,\phi)$ in Eq. 2 is determined. According to an example, the numerator and denominator are approximated separately. The numerator expression, which represents the difference between the numbers of tuples satisfying $\phi$ in $D^{opt}$ and D, respectively, is approximated using D's violations with respect to $\phi$. Thus, the expression $vio(D,\{\phi\})$ can be used as the numerator in Eq. 2.

According to an example, it can be assumed that the updates within a group c are independent. Hence to approximate the denominator of Eq. 2, it can be assumed further that there is only one suggested update $r_j$ in c. The effect of this last assumption is that two possible clean desired databases are considered: one in which $r_j$ is correct, denoted by $D^{r_j}$, and another one in which $r_j$ is incorrect, denoted by $D^{\bar{r}_j}$. Consequently, there are two possibilities for the denominator of Eq. 2, each with a respective probability $p_j$ and $(1-p_j)$.

This approximation can be applied independently for each $r_j \in c$ and used to estimate the quality loss ql as follows:

$$E[ql(D|c, \phi)] = \sum_{r_j \in c} \left[ \tilde{p}_j \cdot \frac{vio(D, \{\phi\})}{|D^{r_j}| = \phi|} + (1-\tilde{p}_j) \frac{vio(D, \{\phi\})}{|D^{\bar{r}_j}| = \phi|} \right] \quad (4)$$

where $p_j$ is approximated with $\tilde{p}_j$.

The expected loss in data quality for the database D, given the suggested group of updates c, can be then approximated based on Eq. 3 by replacing ql with E[ql] obtained from Eq. 4:

$$E[L(D|c)] = \sum_{\phi_i \in \Sigma} w_i \sum_{r_j \in c} \left[ \tilde{p}_j \frac{vio(D, \{\phi\})}{|D^{r_j}| = \phi|} + (1-\tilde{p}_j) \frac{vio(D, \{\phi\})}{|D^{\bar{r}_j}| = \phi|} \right] \quad (5)$$

According to an example, the expected loss for $D^{r_j}$ and $D^{\bar{r}_j}$ using Eq. 3 and Eq. 5 can also be determined as follows:

$$E[L(D^{r_j})] = \sum_{\phi_i \in \Sigma} w_i \cdot \frac{vio(D^{r_j}, \{\phi_i\})}{|D^{r_j}| = \phi_i|}$$

where $\tilde{p}_j$ since in $D^{r_j}$, $r_j$ is considered correct, and:

$$E[L(D^{\bar{r}_j})] = \sum_{\phi_i \in \Sigma} w_i \cdot \frac{vio(D^{\bar{r}_j}, \{\phi_i\})}{|D^{\bar{r}_j}| = \phi_i|}$$

where $\tilde{p}_j = 0$ since in $D^{\bar{r}_j}$, $r_j$ is considered incorrect.

Using Eq. 1 and substituting L(D|c) with E[L(D|c)] from Eq. 5, an estimate for the data quality gain of acquiring feedback for the group c can be determined:

$$E[g(c)] = E[L(D|c)] - \sum_{r_j \in c} \left[ \tilde{p}_j E[L(D^{r_j})] + (1-\tilde{p}_j) E[L(D^{\bar{r}_j})] \right]$$

$$= \sum_{\phi_i \in \Sigma} w_i \sum_{r_j \in c} \left[ \tilde{p}_j \frac{vio(D, \{\phi_i\})}{|D^{r_j}| = \phi_i|} + (1-\tilde{p}_j) \frac{vio(D, \{\phi_i\})}{|D^{\bar{r}_j}| = \phi_i|} \right] -$$

$$\sum_{r_j \in c} \left[ \tilde{p}_j \sum_{\phi_i \in \Sigma} w_i \frac{vio(D^{r_j}, \{\phi_i\})}{|D^{r_j}| = \phi_i|} + (1-\tilde{p}_j) \sum_{\phi_i \in \Sigma} w_i \frac{vio(D^{\bar{r}_j}, \{\phi_i\})}{|D^{\bar{r}_j}| = \phi_i|} \right]$$

Note that $vio(D,\{\phi_i\}) - vio(D^{\bar{r}_j},\{\phi_i\}) = 0$ since $D^{\bar{r}_j}$ is the database resulting from rejecting the suggested update $r_j$ which will not modify the database.

Therefore, $D^{\bar{r}_j}$ is the same as D with the same violations. After rearrangement, the final formula to compute the estimated gain for c is:

$$E[g(c)] = \sum_{\phi_i \in \Sigma} \left[ w_i \sum_{r_j \in c} \tilde{p}_j \frac{vio(D, \{\phi_i\}) - vio(D^{r_j}, \{\phi_i\})}{|D^{r_j}| = \phi_i|} \right] \qquad (6)$$

According to an example, the main objective to improve the quality is to reduce the number of violations in the database 200. Therefore, the difference in the number of database violations before and after applying $r_j$, is a component in computing the update benefit. This component is computed, under the first summation, for every rule $\phi_i$ as a fraction of the number of tuples that would be satisfying $\phi_i$, if $r_j$ was applied. Since the accuracy of the repair $r_j$ is unknown, the term cannot be used under the first summation as a final benefit score. Instead, the expected update benefit is determined by approximating certainty about the benefit by the prediction probability $\tilde{p}_j$.

For the example in FIG. 1, assume that the repairing algorithm generated 3 updates to replace the value of the CT attribute by 'Michigan City' in $t_2$, $t_3$ and $t_4$. Assume also that the probabilities, $\tilde{p}_j$, for each of them are 0.9, 0.6, and 0.6, respectively. The weights $w_i$ for each $\phi_i$, i=1, . . . , 5 are {4/8, 1/8, 2/8, 1/8, 3/8}. Due to these modifications, only $\phi_1$ will have its violations affected. Then for this group of updates, the estimated benefit can be computed as follow using Eq. 6:

$$\frac{4}{8} \times \left( 0.9 \times \frac{4-3}{1} + 0.6 \times \frac{4-3}{1} + 0.6 \times \frac{4-3}{1} \right) = 1.05.$$

A machine learning process can be provided to reduce the cost of acquiring user feedback for verifying each update. Accordingly, in block 305 of FIG. 3, a learning module is provided. The learning module can order updates within a group, such as a selected group c, such that updates within that group which would most benefit or improve the model prediction accuracy as a result of being scrutinized by a user come first within the selected group, or are presented to a user first. The updates are displayed to the user in block 307 along with their learner predictions representing a measure of the correctness of the update. A user can then give feedback on the top $n_s$ updates and correct any mistakes made by the learner. According to an example, newly labeled examples in $n_s$ are added to a learner training dataset $T_r$ and an active learner can be retrained using the new data. The learner module can then provide new predictions and reorder the currently displayed updates based on the training examples obtained so far. If the user is not satisfied with the predictions, the user can provide feedback on another $n_s$ updates from c. This interactive process can continue until the user is either satisfied with the learner predictions, and thus delegates the remaining decisions on the suggested updates in c to the learned model, or the updates within c are all labeled, i.e., verified, by the user.

According to an example, learning module 305 provides a machine learning process that can construct a classification model. By delegating some decisions on suggested updates to such models, it is possible to provide semi-automatic database repair. Ultimately, a user can be the one to decide whether the classifiers are accurate while inspecting the suggestions in an example.

The learning module 305 can predict for a suggested update r=<t,A,v,s> one of the following predictions (which corresponds to the expected user feedback): (i) "confirm" that the value of t[A] should be v; (ii) "reject" in the case that v is not a valid value for t[A] and another update is desired; and (iii) "retain" in the case, t[A] is a correct value and there is no need to generate more updates for it. According to an example, a user may also suggest new value v' for t[A] which can be considered as confirmed feedback for the repair r'=<t, A,v',1>.

In the learning module 305, a set of classification models $\{M_{A_1}, \ldots, M_{A_n}\}$, one for each attribute $A_i \in attr(R)$ is learned. Given a suggested update for $t[A_i]$, model $M_{A_i}$ is consulted to predict some user feedback. In an example, the models are trained by examples acquired incrementally from previous user input. For a given update r=<t,$A_i$,v,s> and user feedback 311 in the form of F∈{confirm, reject, retain}, a training example for model $M_A$ is constructed in the form <t[$A_1$], . . . , t[$A_n$],v,R(t[$A_i$],v),F>. Here, t[$A_1$], . . . , t[$A_n$] are the original attributes' values of tuple t and R(t[$A_i$],v) is a function that quantifies the relationship between t[$A_i$] and its suggested value v.

Including the original dirty tuple along with the suggested update value enables the classifier to model associations between original attribute values and suggested values. Including the relationship function R enables the classifier to model associations based on similarities that do not depend solely on the values in the original database instance and the suggested updates.

According to an example, a data repair system and apparatus can use active learning. Active learning initiates with a preliminary classifier learned from a small set of labeled training examples 309. The classifier is applied to the unlabeled examples and a scoring mechanism is used to estimate the most valuable example to label next and add to the training set. Many criteria have been proposed to determine the most valuable examples for labeling by focusing on selecting the examples whose predictions have the largest uncertainty.

One way to derive the uncertainty of an example is by measuring the disagreement amongst the predictions it gets from a committee of k classifiers. The committee is built so that the k classifiers are slightly different from each other, yet they all have similar accuracy on the training data. For an update r to be classified by label F∈ {confirm, reject, retain}, it would get the same prediction F from all members. The uncertain ones will get different labels from the committee and by adding them in the training set the disagreement amongst the members will be lowered.

According to an example, each model $M_{A_i}$ is a random forest which is an ensemble of decision trees that are built in a similar way to construct a committee of classifiers. Random forest learns a set of k decision trees. The number of instances in the training is denoted N and the number of attributes in the examples M. According to an example, each of the k trees are learned as follows: randomly sample with replacement a set S of size N'<N from the original data, then learn a decision tree with the set S. The random forest algorithm can typically use a standard decision-tree learning algorithm with the exception that at each attribute split, the algorithm selects the best attribute from a random subsample of M'<M attributes. According to an example, a random forest implementation with k=10 and default values for N' and M' can be used.

To classify an update r=<t,$A_i$,v,s> with the learned random forest $M_{A_i}$, each tree in the ensemble is applied separately to obtain the predictions $F_1, \ldots, F_k$ for r, then the majority prediction from the set of trees is used as the output classification for r. The learning benefit or the uncertainty of predictions of a committee can be quantified by the entropy on the fraction of committee members that predicted each of the class labels.

For example, assume that $r_1$,$r_2$ are two candidate updates to change the CT attribute to 'Michigan City' in tuples $t_2$,$t_3$ of FIG. 1. The model of the CT attribute, $M_{CT}$, is a random forest with k=5. By consulting the forest $M_{CT}$ the predictions {confirm, confirm, confirm, reject, retain} can be obtained for $r_1$, and for $r_2$, the predictions {confirm, reject, reject, reject, reject}. In this case, the final prediction for $r_1$ is "confirm" with an uncertainty score of 0.86 (=−⅗×$\log_3$⅗−⅕×$\log_3$⅕−⅕×$\log_3$⅕) and for $r_2$ the final prediction is "reject" with an uncertainty score of 0.45. In this case, $r_1$ will therefore appear to a user before $r_2$ because it has higher uncertainty.

According to an example, a process for correcting an entry in a record of a database therefore includes:
- identifying missing, inconsistent, inaccurate or otherwise dirty tuples in a database using multiple data quality rules;
- generating and storing a set of initial possible database updates;
- grouping the initial possible database updates into multiple groups;
- ranking or sorting the groups to provide an ordered listing of groups in which a group determined as providing the most beneficial database updates appears at the head of the list;
- selecting a group from the ranked list;
- ordering updates within the selected group using learner predictions and/or user feedback data until an end state is determined in which a user can be considered satisfied with the learner predictions, or has verified all the updates in the selected group;
- applying the learner decisions and user feedback to the database in order to correct the identified tuples;
- removing rejected updates and replacing as desired; and
- identifying new inconsistent, inaccurate or otherwise dirty tuples in a database using the multiple data quality rules.

According to an example, once an update r=<t,A,v,s> is confirmed to be correct, either by the user or the learning module 305, it is applied to the database 200 resulting into a new database instance. Consequently, (i) new violations may arise and hence the on demand update discovery process needs to be triggered for the new dirty tuples, and (ii) some of the already suggested updates that are not verified yet may become inconsistent since they were generated according to a different database instance. For example, with reference to FIG. 1, two updates are proposed: $r_1$ replaces $t_6$[ZIP]=46391 and $r_2$ replaces $t_6$[CT]="FT Wayne". If user input data representing feedback is received confirming $r_1$, then $r_2$ is not consistent with the new database instance and the rules anymore since $t_6$ will fall in the context of $\phi_4$. The on demand process can then find a consistent update $r'_2$ that corresponds to replacing $t_6$[CT] by 'Westville', and $r_2$ can be discarded in favor of $r'_2$.

Figure 4:
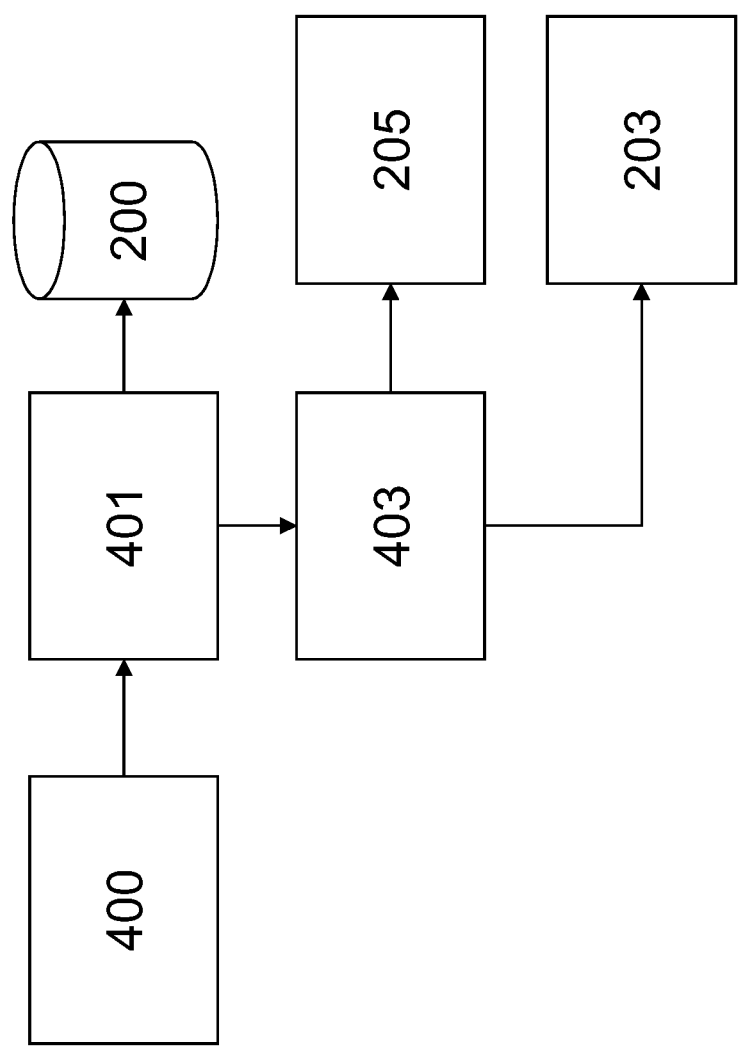
FIG. 4 is a schematic block diagram of an aspect of a database repair system according to an example.

FIG. 4 is a schematic block diagram of an aspect of a database repair system according to an example. An update consistency management module 403 can be used to receive an update 401 to be applied to database 200. For example, the update 401 can be a confirmed update in response to user input data 400 representing user feedback as described above. The update consistency management module 403 provides input to the set of possible updates 205 for the database 200 and the list of identified dirty tuples 203. For example, in the case of repairing online databases, the consistency manager module 403 can be informed (e.g., through database triggers) of any newly added or modified tuples so it can maintain the consistency of the suggested updates. Accordingly, the system can be used for monitoring data entries and immediately suggesting updates during the data entry process.

Figure 5:
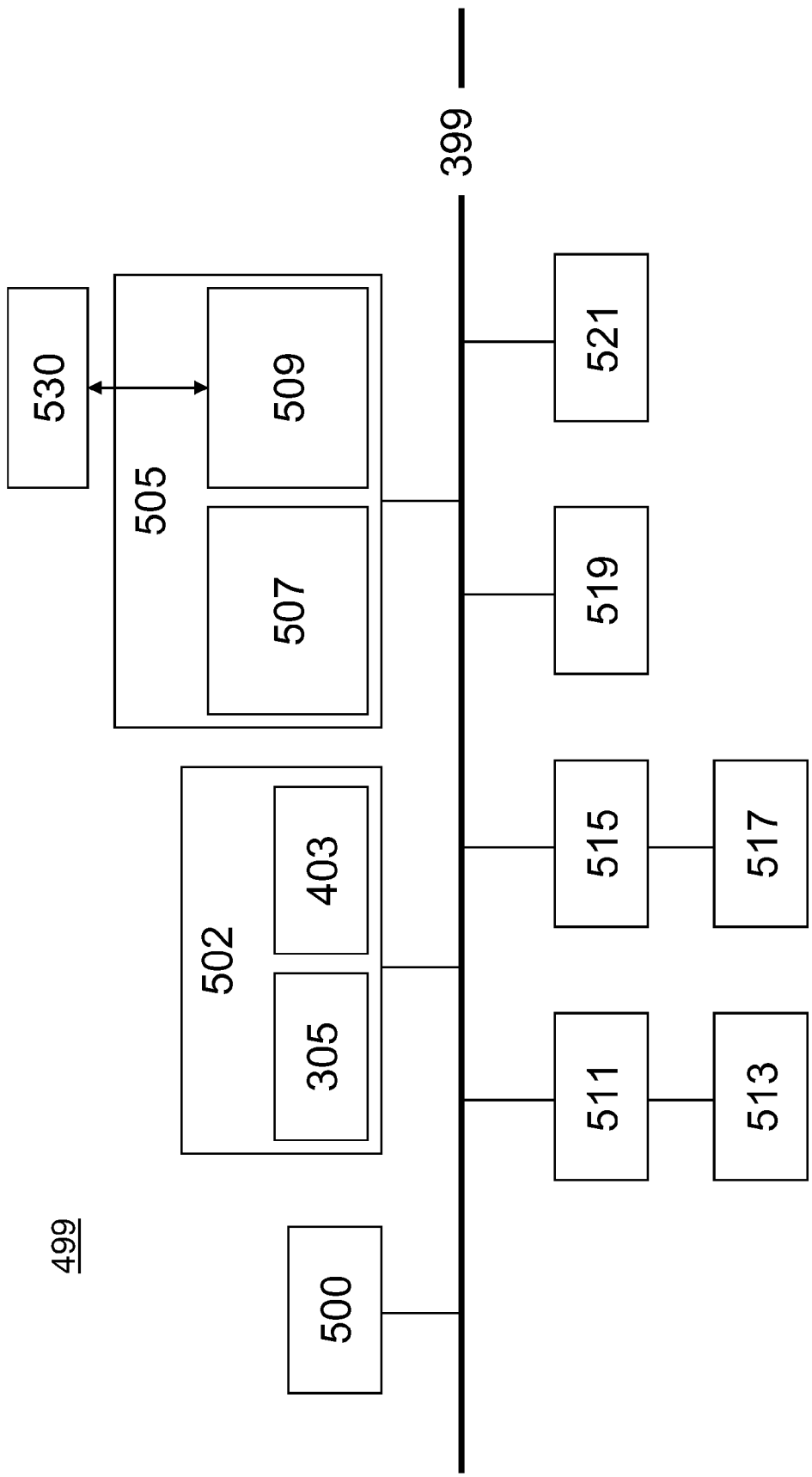
FIG. 5 is a schematic block diagram of an apparatus according to an example suitable for implementing any of the system or processes described above with reference to FIGS. 1 to 4.

FIG. 5 is a schematic block diagram of an apparatus according to an example suitable for implementing any of the system or processes described above. Apparatus 499 includes one or more processors, such as processor 500, providing an execution platform for executing machine readable instructions such as software. Commands and data from the processor 500 are communicated over a communication bus 399. The system 499 also includes a main memory 502, such as a Random Access Memory (RAM), where machine readable instructions may reside during runtime, and a secondary memory 505. The secondary memory 505 includes, for example, a hard disk drive 507 and/or a removable storage drive 530, representing a floppy diskette drive, a magnetic tape drive, a compact disk drive, etc., or a nonvolatile memory where a copy of the machine readable instructions or software may be stored. The secondary memory 505 may also include ROM (read only memory), EPROM (erasable, programmable ROM), EEPROM (electrically erasable, programmable ROM). In addition to software, data representing any one or more of updates, possible updates or candidate replacement entries, and listings for identified tuples may be stored in the main memory 502 and/or the secondary memory 505. The removable storage drive 530 reads from and/or writes to a removable storage unit 509 in a well-known manner. A learning component or module 305 may reside in memory 502 during runtime to provide a specific implementation of apparatus 499. Further, update consistency management module 403 may reside in memory 502. It will be appreciated that data quality rules, training examples and models, updates in a confirmed or unconfirmed state, listings, groupings whether ranked, sorted or otherwise, and any other data for implementing a process described above may be stored on any one or more of device 507, 509 or in 502.

A user interfaces with the system 499 with one or more input devices 511, such as a keyboard, a mouse, a stylus, and the like in order to provide user input data such as data 311, 400 for example. The display adaptor 515 interfaces with the communication bus 399 and the display 517 and receives display data from the processor 500 and converts the display data into display commands for the display 517. A network interface 519 is provided for communicating with other systems and devices via a network (not shown). The system can include a wireless interface 521 for communicating with wireless devices in a wireless community.

It will be apparent to one of ordinary skill in the art that one or more of the components of the system 499 may not be included and/or other components may be added as is known in the art. The system 499 shown in FIG. 5 is provided as an example of a possible platform or apparatus that may be used, and other such types of platforms may be used. One or more of the steps described above may be implemented as instructions embedded on a computer readable medium and executed on the system 499. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running a computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated above may be performed by any electronic device capable of executing the above-described functions.

Figure 6:
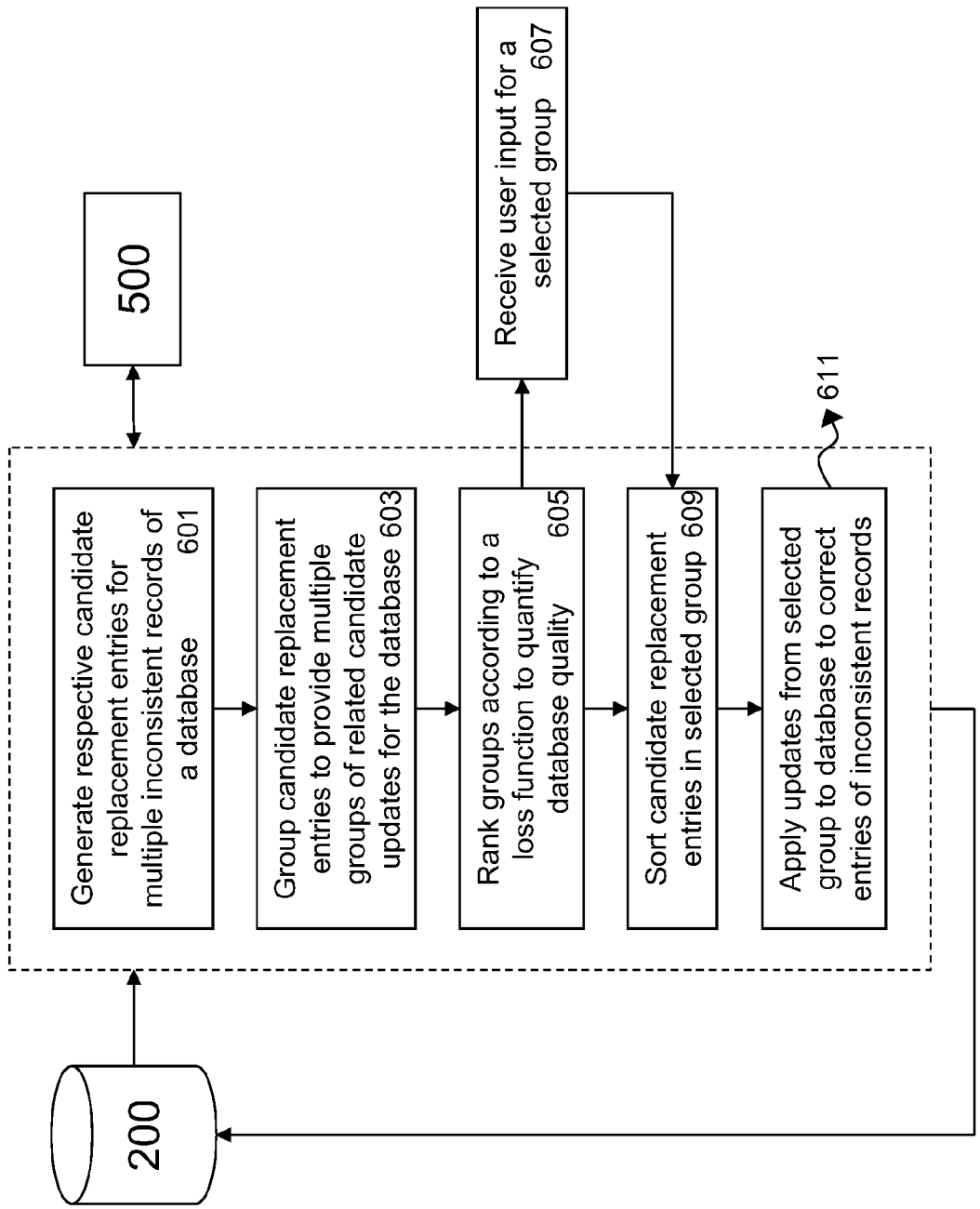
FIG. 6 is a schematic block diagram of a method according to an example.

FIG. 6 is a schematic block diagram of a method according to an example. In block 601 respective candidate replacement entries for multiple inconsistent records of a database 200 are generated. According to an example, a processor 500 can be used to perform certain or all of the steps associated with the method of FIG. 6. For example, at least generating in block 601 can be performed by processor 500. In block 603 candidate replacement entries are grouped to provide multiple groups of related candidate updates for the database. According to an example, grouping can include assigning entries to a group either by altering a physical location of an entry, or by updating an identifier associated with the entry such as identifier which can be used by processor 500 to locate the entry on a physical storage medium such as a hard drive or removable storage as described with reference to FIG. 5 for example.

In block 605 groups are ranked or sorted according to a loss function to quantify database quality. According to an example, sorting provides an ordered listing of groups in which a group determined as providing the most beneficial database updates appears at the head of the list. The group providing the next most beneficial updates appears next and so on. A group from the ranked list is then selected. In an example, and as shown in block 607, the selection can be performed on the basis of user input which can be used to provide user input data for a selected group. However, it is also possible that a group can be selected automatically, as depicted by the arrow joining blocks 605 and 609 directly and therefore skipping the provision of user selection.

In block 609 candidate replacement entries in the selected group are sorted. According to an example, updates within the selected group can be sorted or arranged using learner predictions and/or user feedback data. This can continue until an end state is determined in which, for example, a user can be considered satisfied with the learner predictions, or has verified all the updates in the selected group. In block 611 updates from the selected group are applied to database 200 to correct, or otherwise amend entries of inconsistent records.

What is claimed is:

1. A computer implemented method for correcting records in a database comprising:
   generating, using a processor, respective candidate replacement entries for multiple inconsistent records of the database;
   grouping the candidate replacement entries to provide multiple groups of related candidate updates for the database;
   ranking the groups according to a loss function to quantify database quality;
   presenting the ranked groups to a user;
   prompting the user for updates to the presented ranked groups;
   receiving input for updates from the user for a selected group from the ranked groups;
   sorting candidate replacement entries in the selected group to quantify a desirability of a given level of database quality; and
   applying the updates from the selected group to the database to correct entries of the inconsistent records.

2. A method as claimed in claim 1, wherein generating respective candidate replacement entries includes:
   using data quality rules associating multiple attributes of records in the database to determine a set of inconsistent records of the database; and
   determining a modified entry of respective inconsistent records to provide the candidate replacement entries.

3. A method as claimed in claim 2, wherein a data quality rule is a conditional functional dependency.

4. A method as claimed in claim 1, wherein the loss function is used to generate a measure representing a loss or gain in data quality of the database for the groups.

5. A method as claimed in claim 4, wherein the measure is a measure which is inversely proportional to conformity of a record with a data quality rule.

6. A method as claimed in claim 1, wherein receiving input includes receiving input for multiple ones of the candidate updates in a group to provide an updated group including revised candidate updates.

7. A method as claimed in claim 6, further comprising:
   using the revised candidate updates to provide or refine multiple training models for a learning component; and
   generating revised groups of related candidate updates for the database using the training models.

8. A method as claimed in claim 1, wherein sorting candidate replacement entries in the selected group includes sorting the updates to provide a ranked listing of updates.

9. A method as claimed in claim 8, wherein sorting the updates includes generating a measure for an update representing an uncertainty value in the accuracy of the update.

10. A computer program embedded on a non-transitory tangible computer readable storage medium, the computer program including machine readable instructions that, when executed by a processor, implement a method comprising:
    identifying multiple records in a database including respective inconsistent data entries;
    generating a set of candidate replacement records for the database in which the inconsistent data entries are modified to provide modified data entries;
    classifying the replacement records into sets according to one or more criteria relating to the respective modified data entries of the records;
    presenting the sets to a user;
    prompting the user for input;
    receiving user input representing a confirmation, rejection or modification of a modified data entry in a replacement record in a set; and
    updating the database on the basis to the received user input.

11. The computer program embedded on a non-transitory tangible computer readable storage medium as claimed in claim 10 further comprising instructions that, when executed by the processor, implement a method comprising:
    calculating a quality value for the database including the replacement records and using the quality value to generate a measure representing a loss in quality for the database given the replacement records.

12. The computer program embedded on a non-transitory tangible computer readable storage medium as claimed in claim 10 further comprising instructions that, when executed by the processor, implement a method comprising:
    using the user input to refine a training model for providing a set of modified data entries.

13. The computer program embedded on a non-transitory tangible computer readable storage medium as claimed in claim 10 further comprising instructions that, when executed by the processor, implement a method comprising:

receiving user input representing a selected set;

ranking replacement records in the selected set to provide an ordered list wherein updates with a higher measure representing an uncertainty in the accuracy of the update appear higher up the list.

14. Apparatus for updating a database including multiple inconsistent data records, comprising:

a storage device to store multiple data records of the database;

a processor, coupled to the storage device, to determine a set of inconsistent data records of the database by comparing respective ones of the data records against multiple data quality measures representing conditional functional dependencies of the data records, and to generate a set of replacement records including modified data entries, and to group the replacement records into multiple groups based on the modified data entries;

a user input device to receive user input data representing user input for the apparatus and representing an indication of accuracy of a modified data entry in a group; and a learning module to receive the user input data and to generate a set of revised replacement records for the database.

15. Apparatus as claimed in claim 14, further to sort replacement records in a selected group to provide a ranked listing of updates for the database based on an uncertainty measure for the update.

16. Apparatus as claimed in claim 14, further comprising an update consistency manager module to receive an update to be applied to the database and to modify a replacement record or group on the basis of the received update.

17. Apparatus as claimed in claim 14, further comprising a learning module to receive training models based on user input data and to generate a set of replacement records on the basis thereof.

* * * * *